US005889676A

United States Patent [19]

Kubo et al.

[11] Patent Number: 5,889,676

[45] Date of Patent: Mar. 30, 1999

[54] POINT OF SALES SYSTEM

[75] Inventors: Jiro Kubo, Arlington Heights; Mark Shuttleworth, Roselle; Naotugu Tokumura, Streamwood; Sang Lee, Skokie, all of Ill.

[73] Assignee: Matsushita Electric Industrial Co., Ltd., Osaka, Japan

[21] Appl. No.: 657,124

[22] Filed: Jun. 3, 1996

[51] Int. Cl.[6] .................... G06F 17/00

[52] U.S. Cl. .................... 364/479.01; 364/479.06; 364/479.14

[58] Field of Search .................... 364/479.01, 479.02, 364/479.04, 479.06, 479.07, 479.1, 479.11, 479.14; 705/21; 222/63

[56] References Cited

U.S. PATENT DOCUMENTS

| | | | |
|---|---|---|---|
| 4,683,536 | 7/1987 | Yamamoto | 364/408 |
| 5,270,943 | 12/1993 | Warn | 364/479.07 |
| 5,299,135 | 3/1994 | Lieto et al. | 364/479.11 |
| 5,313,664 | 5/1994 | Sugiyama et al. | 364/405 |
| 5,394,336 | 2/1995 | Warn et al. | 364/479.11 |
| 5,400,253 | 3/1995 | O'Connor | 364/479.11 |
| 5,557,529 | 9/1996 | Warn et al. | 364/479.1 |
| 5,663,887 | 9/1997 | Warn et al. | 364/479.02 |
| 5,694,326 | 12/1997 | Warn et al. | 364/479.01 |

*Primary Examiner*—William E. Terrell
*Assistant Examiner*—Wonki Park
*Attorney, Agent, or Firm*—McDermott, Will & Emery

[57] ABSTRACT

This invention is related to a point of sales system that integrates a fuel dispensing controller with POS terminals. The primary purpose of this invention is to provide a POS system which can continue to operate despite a malfunction in the hardware or software associated with the in-store controller. The POS system of the present invention comprises an in-store controller, at least one POS terminal connected to said in-store controller, a fuel dispenser controller connected to at least one fuel dispenser, a switching device connecting said fuel dispenser controller to either said in-store controller or said POS terminal, and control programs for controlling said fuel dispenser controller, and the in-store controller and the POS terminal have the control program respectively.

16 Claims, 4 Drawing Sheets

POINT OF SALES SYSTEM

FIELD OF THE INVENTION

This invention is related to a point of sales (hereinafter called "POS") system and more particularly, to a POS system that integrates a fuel dispensing controller with POS terminals.

BACKGROUND OF THE INVENTION

In general, a POS system refers to a computer-connected terminal used in place of a cash register in a store, for processing customer checkouts and such additional functions such as recording processing inventory data, transferring funds from a customer's bank account(s) to the store, and checking credit on charged or charge-card purchases. Years ago, fuels were sold primarily at service stations which limited their products to fuel and some auto accessories. For this type of retail operation, a simple cash register was all that was needed to record sales.

Today, however, many fuel stations have expanded their product lines to include grocery items, household goods, novelty items, prepared foods and the like. These retail operations are usually referred to as convenience stores. These large retail operations need a more sophisticated cash register, like a POS system to record sales, manage inventories, and the like. Referring now to the FIG. 1, a conventional POS system, which integrates a fuel dispenser controller and several POS terminals is explained below. An in-store controller 6 and a plurality of POS terminals 7,8 are electrically connected. The POS terminals serve the function of a cash register and generally comprise a key board, bar-code reader, display, printer and the like. The in-store controller 6 is provided usually in a management room separated from the retail space. The plurality of POS terminals are provided on the sales counters of the store. A fuel dispenser controller is connected electrically to a plurality of fuel dispensers (not shown) and controls the operation of each fuel dispenser. The fuel dispenser controller 5 is also electrically connected to the in-store controller 6. Information Data as to the fuel dispensing operation are transferred between the in-store controller 6 and the fuel dispenser controller 5. Further, the in-store controller 6 has control program that is recorded on a memory device 3, such as floppy disk, for controlling the fuel dispenser controller 5. In the system shown in FIG. 1, a fuel dispenser controller and POS terminals are integrated into a POS system. This arrangement provides effective sales management, such as recording sales data, and managing of the fuel inventory. However, in such integrated POS system, if the in-store controller 6 suffered malfunction, the sales operations in the service station would be stopped entirely. Such a stoppage would result in a serious disadvantage to the fuel sales, especially in the large scale service stations. For example, a problem may occur in the hardware associated with the in-store controller, such as a disconnected cable or other mechanical or electrical trouble, or in the software associated with the in-store controller, such as over flow, program error and the like. However, if the other POS terminals 7, 8 and fuel dispenser controller 5 remain functional, it would be advantageous to enable the POS system to continue to operate through the available POS computer terminals 7, 8. The primary purpose of this invention is to provide a POS system having POS terminals and fuel dispenser controller, which can continue to operate despite a malfunction in the hardware or software associated with the in-store controller.

SUMMARY OF THE INVENTION

The present invention relates to a POS system wherein a fuel dispenser controller is integrated with POS terminals. The POS system of the present invention comprises an main POS control computer (hereinafter called an in-store controller), at least one POS terminal connected to said in-store controller, a fuel dispenser controller connected to at least one fuel dispenser, a switching device connecting said fuel dispenser controller to either said in-store controller or said POS terminal, and control programs for controlling said fuel dispenser controller, and the in-store controller and the POS terminal have the control program respectively. Further, in PC-based POS systems, the POS terminal can be constructed with general-purpose personal computer (PC). General-purpose personal computers have sufficiently fast processing time and large memory capacities, that the in-store controller may be replaced with general PC-based POS terminals.

DESCRIPTION OF THE PREFERRED EMBODIMENTS (First Embodiment)

Figure 1:
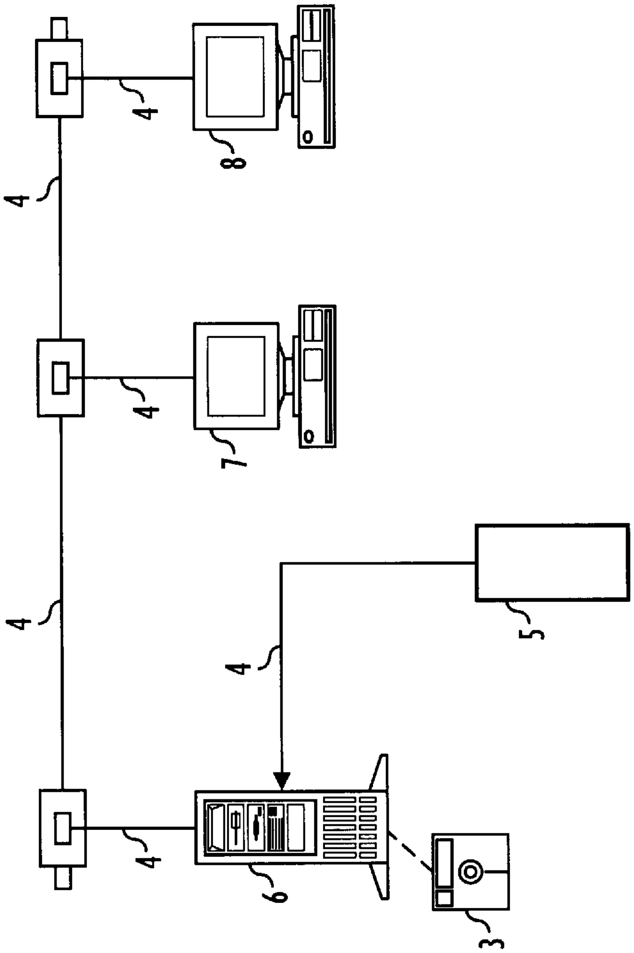
FIG. 1 PRIOR ART
FIG. 1 shows the structure of a conventional POS system for fuel and merchandise sales operation.
Figure 2:
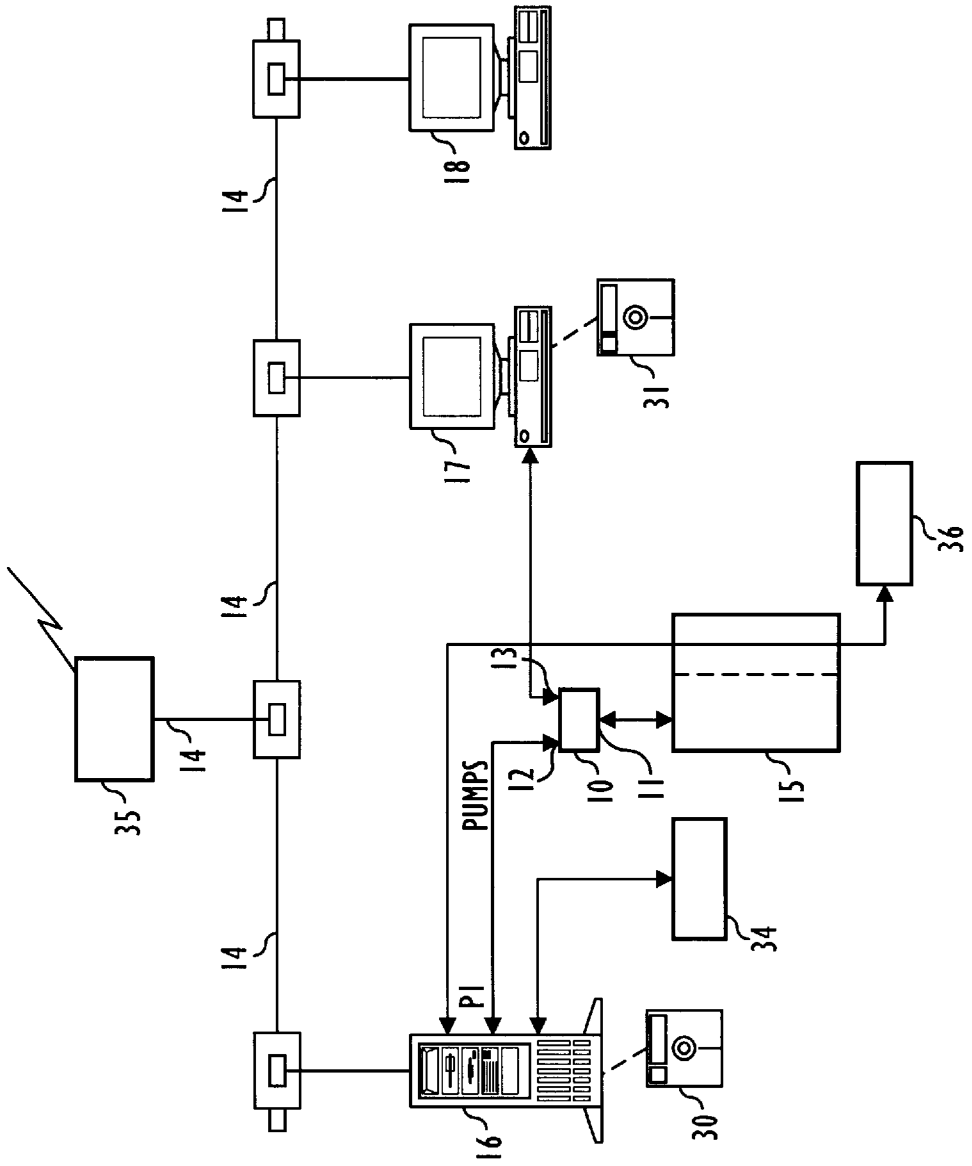
FIG. 2 shows the structure of a POS system according to a first embodiment of the present invention.

The first embodiment of this invention is described below. Referring to the FIG. 2, which shows the structure of the first embodiment, there are shown an in-store controller 16, POS terminal 17 and POS terminal 18. The in-store controller 16 and POS terminals 17,18 are connected by electrical communication lines 14, such as Ethernet cabling. In FIG. 2, although two POS terminals 17 and 18 are shown, one or more POS terminals can be connected to the in-store controller 16. As the POS terminal 17 and 18, general personal-purpose computers (PC) are used in this embodiment. Such PC-based POS terminals are preferable to accommodate the future possibility of expanding the functions of the operation, such as additional operations of new retail devices. These PC-based POS terminals 17 and 18 are provided on each sales counter in the store of the gas service station. Inside the store, grocery items, foods, drinks can be sold through the PC based POS terminals 17 and 18. Each PC-based POS terminal may have a keyboard for inputting prices of articles being sold, a bar-code reader for optically scanning the barcodes mounted on articles being sold, a printer for printing out a receipt, and the like. Such PC-based POS terminals also have a terminal display device, such as a cathode ray tube (CRT). Some of the sales operations in the store may be conducted by a touch screen input device, which may be provided on the POS terminal display device. In this first embodiment, an in-store controller 16 (main computer)is for the exclusive use of the sales management rather than a merchandise retail function. The in-store controller 16 is generally provided in a management room of the store rather than the retail portion of the store. Also, a satellite system 35 is provided so that each service station can transfer sales data from the in-store controller 16 to a central computer (not shown). In this manner, a central computer can record data from a group of gas service stations. This arrangement enables accurate cash management at the time and point of any sales, the correction of sales data, and the collection of data relative to each article sold, and the like, to be carried out in real time by the central computer. In general, this arrangement is preferable for large scale service station. A fuel dispenser controller 15 is connected to the in-store controller 16 through a switching device 10. As shown in FIG. 2, the switching device 10 enables the fuel dispenser controller 15 to be connected with the POS terminal 17. The switching device 10 has three terminals. The first terminal 11 is connected to the I/O port of the fuel dispenser controller 15. The second terminal 12 is connected to the I/O port of a computer that is used as the in-store controller 16. The third terminal 13 is connected to the I/O port of the PC-based POS terminal 17.

The switching device 10 enables the fuel dispenser controller 15 to be connected with either the in-store controller 16 or the POS terminal 17. In this embodiment, the switching device 10 is manually operated. In this embodiment, control programs 30, 31 for controlling the fuel dispenser controller 15 are provided in both the in-store controller 16 and the POS terminal 17 respectively. The fuel dispenser controller 15 is described below. The fuel dispenser controller 15 is electrically connected to one or usually more fuel dispensers (not shown).

In general, fuel dispenser controller 15 is provided inside the store and the fuel dispensers are provided outside the store. The fuel dispensers usually comprise a pump, a fuel supply nozzle, a fuel flow meter, a display and the like. The fuel flow meter measures the quantity of fuel being pumped. Data relevant to the dispensing operation at the fuel dispensers are transferred between the fuel dispensers and the fuel dispenser controller 15. Data signals being sent from the dispensers to the controller 16 may include a dispenser identity (fuel dispenser number), status of each dispenser, and dispensed fuel volume and value. These fuel dispensers are controlled by the keys on the POS terminals, and information on each transaction is passed into the POS terminals 17,18. Today, it is common practice for the vehicle operator or customer to pump fuel from self-service fuel sites. Since the customer pumps the fuel, the dispensers are preferably controlled remotely from the POS terminals 17,18 by store clerks. The operation of such POS terminals is explained as follows. At self-service fuel sites, the customer will usually have to indicate the type of payment on the display which is provided on the fuel dispensers. For example, suppose the customer chooses "cash payment" on the display. Information of the customer's selection to pay by cash is sent to in-store controller 16. The in-store controller 16 will transfer the information to the POS terminals 17,18. The display device of the POS terminals indicate the status of the fuel dispenser being used by the customer and that "cash payment" has been selected by the customer. For example, display device of the POS terminal display an indicator which shows the status of each fuel dispenser controlled by the controller 16, then the color of such indicator on the POS display is changed green to yellow. These features are preferably provided for letting the store clerk know whether a customer has completed fueling and paying for the fuel and preventing a customer to drive away without paying for pumped fuel. Then the store clerk has to input an authorization to start dispensing fuel by input key or touch screen of the POS terminals 17,18. Information regarding the store clerk's authorization is sent to the in-store controller 16. Then the in-store controller 16 transfers the information to the fuel dispenser that the customer is operating. The fuel dispenser displays such authorization to inform the customer to start self-dispensing fuel based on the information sent from the in-store controller 16. After the customer finishes pumping the fuel, information that includes the quantity and/or price of fuel pumped is sent to the POS terminal through the in-store controller 16. As common practice, the customer who selected the option of "cash payment" may have to come into the store and pay for the pumped fuel at the POS terminals 17,18. When the option of "credit card payment" is selected, such a payment can be done through a credit authorization terminal 36 provided at the fuel dispenser. These storage of fuel sales information is controlled by control program 30 provided on the in-store controller 16. However, in case there is a malfunction in the hardware or software associated with the in-store controller 16, the sales of fuel may continue, together with the store of fuel sales information. According to the present invention, the same operation of the fuel dispenser can be carved out by the control program 31, which has basically same function as program 30 to control the fuel dispenser controller 15. Turning the switching device 10 so as to connect the POS terminal 17 and the fuel dispenser controller 15, the operation can continue smoothly. In this embodiment, a car-wash machine controller 34 can also be connected to the in-store controller 16 in order to operate the car washing machine through the POS system. According to this first embodiment, as described above, even if serious trouble occurs in the in-store controller, fuel sales operations in such service station is not curtailed. A stoppage in fuel sales can be prevented. Hence, when a problem occurs in hardware or in the software associated with the in-store controller, the fuel dispensing operation can continue to operate by connecting POS terminal 17 and fuel dispenser controller 15. Further, as shown FIG. 2, a credit authorization terminal 36 is provided for checking credit status of a customer and authorizing the purchase of fuel or articles by a credit card. This terminal 36 may be located both in sales counter inside the store and in fuel dispensers outside the store in order to pay for both articles and fuels by the credit card. In this embodiment, because the terminal 36 is exclusively controlled by the in-store controller 16, purchasing fuels through this credit authorization terminal can become disabled when a hardware or software problem occurs in the controller 16. However, by connecting the fuel dispenser controller 15 to the POS terminal 17, which has the control program for the fuel dispenser controller 15, fuel sales can continue by cash payment. It is noted that the present invention is applicable to the credit card authorization terminal 36 instead of or in the same way with the fuel dispenser controller 15. By providing a control program for credit authorization terminal on the POS terminal 17, the credit authorization terminal 36 can be operable even when a problem is caused in the in-store controller 16 in the same way with fuel sales operation of this first embodiment. It is further noted that the principal of this invention is applicable to a wide variety of retail device in the same manner with the fuel dispenser controller, credit authorization terminal as described above. Such retail device is constructed so as to be suitable for measuring or counting quantity and/or price of merchandises or services.

(Second Embodiment)

Figure 3:
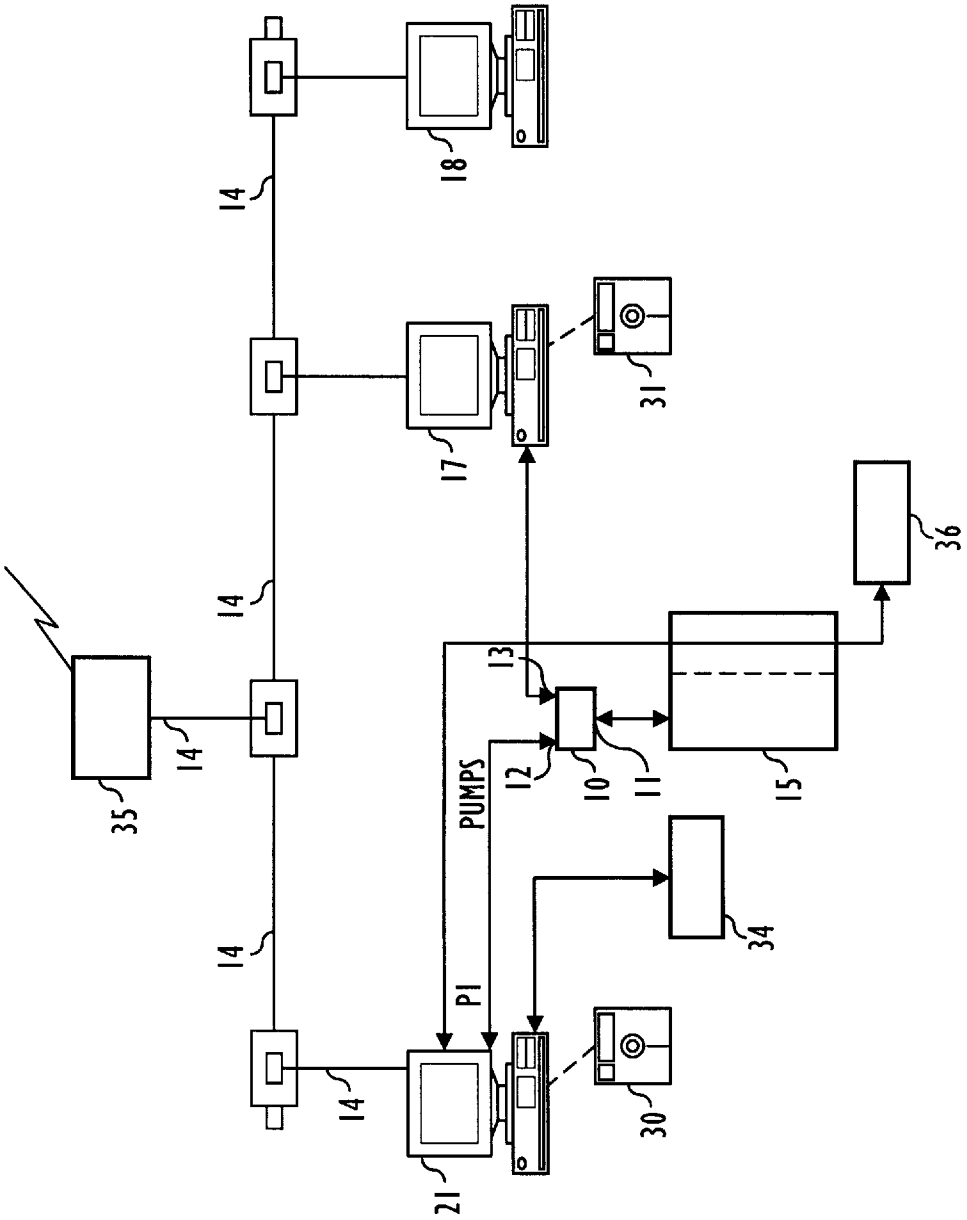
FIG. 3 shows the structure of a POS system according to a second embodiment of the present invention.

The second embodiment of this invention is described next. FIG. 3 shows the structure of the POS system of the second embodiment. Specifically, a PC-based POS terminal 21 (first POS terminal) is used as the sales management computer instead of an in-store controller of the first embodiment. The remaining parts of the second embodiment are the same as the first embodiment. General-purpose personal computers are, recently, highly developed and have sufficiently fast processing time and capability of memory storage capacity, that these general personal computers can be used for PC-based POS terminals and also used as sales management computers commonly. These arrangements are also well suited for small scale service stations because they can save cost by providing an integrated POS system that includes a POS terminal as the management computer also.

(Third Embodiment)

Figure 4:
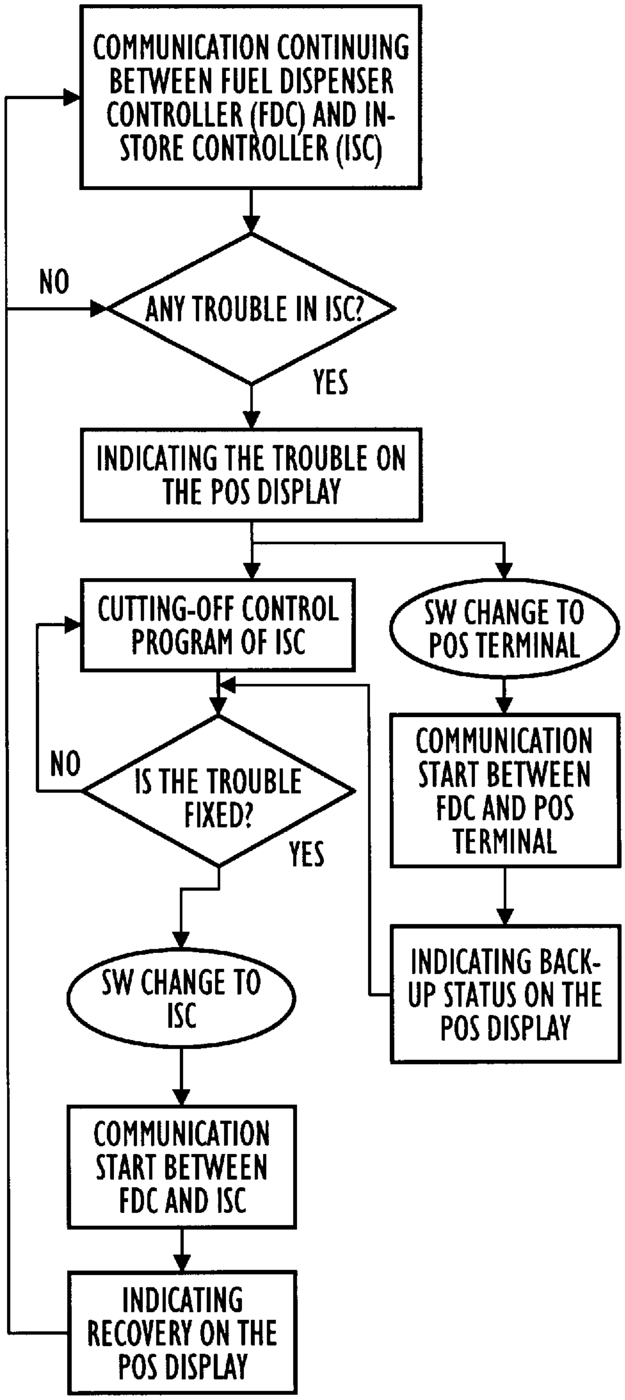
FIG. 4 shows the flow chart of the operation according to a third embodiment of the present invention.

The third embodiment of this invention is explained next. FIG. 4 shows a flow chart of the operation of the control program 31, which is provided in the PC-based POS terminal 17. The structures associated with this embodiment are same as the first or second embodiments. Hence, the explanation for these structures is hereby omitted. Referring now to the FIG. 4, the fuel dispenser controller 15 is primarily controlled by the control program 30 which is provided in the in-store controller 16. In the basic operation, the switching device 10 is turned so as to connect terminal 11 with terminal 12 of the fuel dispenser controller 15. In this third embodiment, a back-up program, which is recorded on recordable medium or memory device, is provided on the POS terminal 17. The back-up program includes a detect module, a cut-off module, and a start-up module. The operations of each module are explained as follows with reference to FIG. 4. A detect module detects a problem being caused in the communication linkage between the in-store controller 16 and fuel dispenser controller 15. It is preferable to display such a problem on the display device of the POS terminals 17,18. For example, by way of changing color of a dispenser icon on the display of the POS terminal, an operator is provided with an indication of a problem. When the communication between the in-store controller 16 and the fuel dispenser controller 15 becomes a problem, a cut-off module of the back-up program operates to disable the control program 30 as soon as such communication problem is detected by the detect module. The store clerk receives an indication of the problem and the change of color of the icon on the display as described above. The clerk can then turn the switching device 10 so as to connect terminal 11 and terminal 13. In other words, the POS terminal 17, which has same control program for the fuel dispenser controller as the in-store controller 16, is connected with the fuel dispenser controller 15. After a communication problem in the in-store controller 16 is detected by the detect module, the start-up module of the back-up program works so as to start the control program 31 to control the fuel dispenser controller 15. This start-up procedure may be conducted at any time after the problem in the in-store controller 16 is detected by the detect module. In this manner, the operation of the fuel dispenser controller 16 become enabled by the control program 31 of the POS terminal 17 even when the in-store controller 16 has communication linkage problems. Further, according to the present invention, if both of the control programs 30 and 31 are operating simultaneously, such may cause further problems. For example, when a problem in occurred in a software associated with the in-store controller 16, the controller 16 may be processing its task incorrectly. As another example, when a communication line between the in-store controller 16 and the fuel dispenser controller 15 is disconnected, control program 30 is still operating correctly. It means that control program 30 may receive no information as to the status of fuel dispenser while the POS terminal 17 is communicating with the fuel dispenser controller 15 correctly. It causes that correct communication between the POS terminal 17 and the fuel dispensing controller 15 is interrupted by the in-store controller 16 regarding dispenser's status. Such problems are vary. To prevent these further trouble, the cut-off module works to stop the control program 30 of the in-store controller 16. Although this embodiment describes the back-up program is provide on the POS terminal 17, it should be noted that the parts of modules which is constituting the back-up program may be provided on the in-store controller instead of the POS terminal 17. One of such example is described in the fourth embodiment of this invention. It is also noted that it is preferable to display the switching indication on the display of the POS terminals 17, 18 when or after the detect module finds a communication linkage problem. Such a switching indication may be displayed by the letters "turn the switch from A to B" on the display. It is also noted that although the switching device 10 is explained as manual switch in this embodiment, electrically or mechanically automated switching device may preferably replace the manual switch. Such an automatic switch may be controlled by the POS terminal 17 when the detect module of the back-up program detects a communication problem between the fuel dispenser controller 15 and in-store controller 16.

(Fourth Embodiment)

As a further example of the back-up operation, a fourth embodiment of the present invention is described below. The structures of this embodiment are same as with the first or second embodiments. Hence, the explanation for such structures is hereby omitted. The POS terminal 17 has a back-up program, which is including a detect module for detecting a problem in the communication linkage between the in-store controller 16 and the fuel dispenser controller 15. The backup program also has a file-writing module for writing a specific file to the in-store controller 16 (the specific file may be written in the memory device, such as hard disk, of the in-store controller 15 ) when a problem is detected by said detect module. The back-up program also has the start-up module for starting said control program 31 of the POS terminal 17 after a problem is detected. In this embodiment, a cut-off program is provided on the in-store controller 16. The cut-off program may be written within the control program 30. The cut-off program has a sensing module for regularly sensing an existence of the specific file that is written by the file writing module of the POS terminal 17, when a communication linkage problem is detected. The cut-off program also has a cut-off module for stopping the operation of the control program 30 of the in-store controller 16 when the sensing module senses the specific file. As described above, the back-up program is provided on the POS terminal 17 and the cut-off program is provided on the in-store controller, in this fourth embodiment. In this manner, the operation of the fuel dispenser controller 16 become enabled by the control program 31 of the POS terminal 17 even when the in-store controller 16 has communication linkage problems. As described in the third embodiment, if both of the control programs 30 and 31 are operating simultaneously, such may cause further problem. According to this embodiment, such further problems are prevented by cutting off the control program 30 of the in-store controller. Of course, it should be noted that a wide range of changes and modifications can be made to the preferred embodiment described above. It is therefore intended that the foregoing detailed description be understood that it is the following claims, including all equivalents, which are intended to define the scope of this invention.

What is claimed is:

1. A POS system comprising:

an in-store controller;

at least one POS terminal connected to said in-store controller;

a fuel dispenser controller connected to at least one fuel dispenser;

a switching device connecting said fuel dispenser controller to either said in-store controller or said POS terminal;

control programs for controlling said fuel dispenser controller, said in-store controller and said POS terminal having said control program;

a back-up program;

said back-up program including:

a detect module for detecting a problem in said in-store controller;

a cut-off module for cutting off said control program of said in-store controller when a problem is detected by said detect module; and a start-up module for starting said control program of said POS terminal after said problem is detected by said detect module.

2. A POS system according to claim 1, said POS terminal having a display device, said display device displaying a problem indication after a problem is detected by said detect module.

3. A POS system according to claim 1, said POS terminal having a display device, and a switching indication which is indicating to turn said switching device so as to connect said fuel dispenser controller and said POS terminal to a user is displayed on said display device after a problem is detected by said detect module.

4. A POS system according to claim 1, said switching device is moved automatically when or after a problem is detected by said detect module.

5. A POS system comprising:

an in-store controller;

at least one POS terminal connected to said in-store controller;

a fuel dispenser controller connected to at least one fuel dispenser;

a switching device connecting said fuel dispenser controller to either said in-store controller or said POS terminal;

control programs for controlling said fuel dispenser controller, said in-store controller and said POS terminal having said control program;

said POS terminal furhter comprising:

a back-up program including a detect module for detecting a problem in a communication linkage between said in-store controller and said fuel dispenser controller;

a file-writing module for writing a specific file to said in-store controller when a problem is detected by said detect module; and a start-up module for starting said control program of said POS terminal after said problem is detected, and said in-store controller further comprising:

a cut-off program having a sensing module for sensing an existence of said specific file in said in-store controller; and a cut-off module for cutting off said control program of said in-store controller when said sensing module sensor said specific file.

6. A POS system according to claim 5, said POS terminal having a display device, said display device displaying a problem indication after a problem is detected by said detect module.

7. A POS system according to claim 5, said POS terminal having a display device, and a switching indication which is indicating to turn said switching device so as to connect said fuel dispenser controller and said POS terminal to a user is displayed on said display device after a problem is detected by said detect module.

8. A POS system according to claim 5, said switching device is moved automatically when or after a problem is detected by said detect module.

9. A POS system having at least two POS terminals comprising:

a first POS terminal;

a second POS terminal connected to said first POS terminal;

a fuel dispenser controller connected to at least one fuel dispenser;

a switching device for connecting said fuel dispenser controller to either said first POS terminal or said second POS terminal;

control programs for controlling said fuel dispenser controller, said first POS terminal and said second POS terminal having said control program;

a back-up program;

said back-up program having a detect module for detecting a problem in said first POS terminal;

a cut-off module for cutting off said control program of said first POS terminal when a problem is detected by said detect module; and a start-up module for starting said control program of said second POS terminal after said problem is detected by said detect module.

10. A POS system according to claim 9, said second POS terminal having a display device, and a problem indication is displayed on said display device after a problem is detected by said detect module.

11. A POS system according to claim 9, said second POS terminal having a display device, and a switching indication which is indicating to turn said switching device so as to connect said fuel dispenser controller to said second POS terminal to a user is displayed on said display device after a problem is detected by said detect module.

12. A POS system according to claim 9, said switching device is moved automatically when or after a problem is detected by said detect module.

13. A POS system having at least two POS terminals comprising:

a first POS terminal;

a second POS terminal connected to said first POS terminal;

a fuel dispenser controller connected to at least one fuel dispenser;

a switching device for connecting said fuel dispenser controller to either said first POS terminal or said second POS terminal;

control programs for controlling said fuel dispenser controller, said first POS terminal and said second POS terminal having said control program;

said second POS terminal further comprising:

a back-up program which is having a detect module for finding a problem in a communication between said first POS terminal said fuel dispenser controller;

a file-writing module for writing a specific file to said first POS terminal when a problem is detected by said detect module;

a start-up module for starting said control program of said second POS terminal after said problem is detected, and said first POS terminal further comprising:

a cut-off program which is having:

a sensing module for regularly sensing a existence of said specific file in said first POS terminal;

a cut-off module for cutting off said control program of said first POS terminal when said sensing module find said specific file.

14. A POS system according to claim 13, said second POS terminal having a display device, and a problem indication is displayed on said display device after a problem is detected by said detect module.

15. A POS system according to claim 13, said second POS terminal having a display device, and a switching indication which is indicating to turn said switching device so as to connect said fuel dispenser controller to said second POS terminal to a user is displayed on said display device after a problem is detected by said detect module.

16. A POS system according to claim 13, said switching device is moved automatically when or after a problem is detected by said detect module.

* * * * *